United States Patent [19]

Darius et al.

[11] Patent Number: 4,769,594
[45] Date of Patent: Sep. 6, 1988

[54] METHOD AND CIRCUIT ARRANGEMENT FOR MEASURING THE DYNAMICAL BEHAVIOR OF A ROTATING BODY

[75] Inventors: Karl-Heinz Darius, Hückelhoven; Horst Kasper, Geilenkirchen, both of Fed. Rep. of Germany

[73] Assignee: Uranit GmbH, Jülich, Fed. Rep. of Germany

[21] Appl. No.: 49,430

[22] Filed: May 14, 1987

[30] Foreign Application Priority Data

May 15, 1986 [DE] Fed. Rep. of Germany ....... 3616390

[51] Int. Cl.$^4$ ............................................. G01R 27/26
[52] U.S. Cl. .............................. 324/61 R; 340/870.37; 73/462
[58] Field of Search ............. 324/61 R, 158 MG, 545; 73/462; 340/870.37

[56] References Cited

U.S. PATENT DOCUMENTS 3,990,005 11/1976 Abbe et al. ........................ 324/61 R Primary Examiner—Reinhard J. Eisenzopf
Assistant Examiner—Anthony L. Miele
Attorney, Agent, or Firm—Spencer & Frank

[57] ABSTRACT

A method and system for measuring the dynamical behavior of an elongate body which has a floating electrical potential and only forms a total capacitance with its environment and which has a longitudinal axis about which the body rotates, which method includes a contact-free capacitive measurement of changes in the position of the body transverse to the longitudinal axis by means of at least two measuring probes each disposed to form with the body a respective capacitor having a capacitance value corresponding to the distance between the probe and the body, the measurement being performed by: applying to each measuring probe a respective alternating current signal having a frequency selected such that the frequency of the signal applied to each probe differs from that applied to each other probe by at least a selected frequency difference value; deriving from each probe an output signal having an amplitude representative of the capacitance value of the capacitor formed by that probe with the body; and passing the output signal from each probe through a respective signal processing circuit having a lowpass characteristic with an upper limit frequency value which is less than the selected frequency difference value, which the signal processing circuits associated with all of the probes having the same upper limit frequency value.

9 Claims, 4 Drawing Sheets

METHOD AND CIRCUIT ARRANGEMENT FOR MEASURING THE DYNAMICAL BEHAVIOR OF A ROTATING BODY

BACKGROUND OF THE INVENTION

The present invention relates to a method for measuring the dynamical behavior of an elongate body which rotates about an axis. A contactless capacitive distance measuring system is used in which at least two measuring probes are arranged in such a manner that they pick up individual capacitance values representing the distance between a respective measuring electrode and the body. The body itself constitutes a total capacitance with respect to its environment. The invention also relates to a circuit arrangement for implementing the method.

In particular, the invention relates to a method of continuously and without contact measuring the distance between a probe and a galvanically isolated, i.e. conductively insulated, almost non-conductive rotating body.

To measure, for example, fast running gas ultracentrifuges with regard to dynamical and mechanical aspects in a vacuum, it is necessary to detect the movement of the long rotor simultaneously in several planes. The number of planes may vary e.g. from 10 up to 30.

Because the time relation between these distance signals is of great significance, all measuring systems employed must operate simultaneously and continuously. However, if a centrifuge is the object being measured, there arises the additional difficulty that the major part of the rotor may be composed of a non-conductive material, during operation all components (including the metal parts) are not conductively connected to ground potential and coupling with ground potential can be realized only by way of the capacitance formed between the rotor and the vacuum vessel. Thus it cannot be avoided that the object being measured causes the measuring signals to be mutually influenced.

Measurements at almost non-conductive bodies can be made at justifiable expense only with systems operating on a capacitive basis, particularly if the object is disposed in a vacuum. Capacitive distance measuring systems made, for example, by DISA Elektronik A/S (DK 2740 Skovlunde, Danmark) are available for this purpose and these have been used with success at the start of development of the new centrifuge generation.

In these systems, a change in distance is detected as a change in capacitance and is fed in the form of a frequency modulation- because the "distance capacitance" of interest is a component of an oscillator resonant circuit—to a suitable evaluation circuit. The system include oscillators which operate in a frequency range of 4 to 6 MHz. However, the actual frequency is now determined not only exclusively by the momentarily measured distance but also by many superposed parasitic influences, such as the configuration of the measuring probe, component scattering in the oscillators, length and position of the connecting cables between measuring probe/tuning plug/oscillator and the ambient temperature.

As long as only one measuring system is employed per object to be measured, all of these possible influences have only a slight effect on the accuracy of the measuring result, particularly if the measurements are short-time measurements and individual calibration is effected each time immediately before the actual measurement.

If a plurality of systems operate on an object to be measured and which is not conductively connected, but only capacitively coupled, all oscillators influence one another over the common rotor/vacuum vessel coupling capacitance. If oscillators operate at frequencies whose mixed products fall into the transmission bandwidth of the demodulators employed, the latter produce output signals which do not originate at all from the object being measured. Erroneous information can therefore not generally be excluded in conventional systems.

Additionally, the long-term stability of the available systems is so poor that frequency recalibration is necessary and this is associated with a great amount of time and, if done on running centrifuges, also with great risk.

SUMMARY OF THE INVENTION

It is therefore an object of the present invention to provide an improved method and circuit arrangement for implementing the method so that structurally caused parasitic influences, e.g. influences from systems themselves on the measuring result, can be kept so low that, as a whole, a distance measuring system results which has good long-term stability and high sensitivity.

In particular, it is an object to provide a measuring system for distance measurements at fast running centrifuge rotors composed of non-conductive materials and connected in operation to ground only by way of the coupling capacitance between rotor and vacuum vessel. Consideration has been given, that a larger number of units simultaneously operate with the same measuring object, that mutual influencing between the output signals should be excluded in principle, that high measuring accuracy is required over a broad operating range, that calibration expenditures should be a minimum with respect to operating time, that the calibration process is to be moved from the object being measured to the laboratory, that structurally caused parasitic influences on the measuring result should be kept as low as possible and, as a whole, the distance measuring system should have a good long-term stability.

The above and other objects are achieved, according to the invention, in a method for measuring the dynamical behavior of an elongate body which forms a total capacitance with its environment and which has a longitudinal axis about which the body rotates, which method includes a contact-free capacitive measurement of changes in the position of the body transverse to the longitudinal axis by means of at least two measuring probes each disposed to form with the body a respective capacitor having a capacitance value corresponding to the distance between the probe and the body, by:

applying to each measuring probe a respective alternating current signal having a frequency selected such that the frequency of the signal applied to each probe differs from that applied to each other probe by at least a selected frequency difference value;

deriving from each probe an output signal having an amplitude representative of the capacitance value of the capacitor formed by that probe with the body; and passing the output signal from each probe through a respective signal processing circuit having a lowpass characteristic with an upper limit frequency value which is less than the selected frequency difference value, with the signal processing circuits associated with all of the probes having the same upper limit frequency value.

Although the capacitive distance measuring system according to the invention employs, as do prior art systems, a high frequency carrier which is modulated by changes in capacitance as a result of changes in distance between the measuring probe and the surface of the object, the present invention, in contrast to the others, does not employ frequency modulation (FM), but rather amplitude modulation (AM), with the frequency remaining quartz stable.

In order to prevent, as required, mutual influences between the systems via the object being measured, two conditions are strictly adhered to:

The bandwidth of the demodulator for the evaluation of the distance information is significantly lower than the frequency differences in the oscillators employed in the individual measuring probes.

Two or more measuring systems employed for the same object never have the same carrier frequency. To not only realize the results of the FM-devices, but to surpass them by far, the following is effected:

increased sensitivity of the shielded measuring probe is realized by optimizing the ratio of active capacitor surface to parasitic stray capacitance with a given maximum diameter;

electrical stability is increased by reducing the possible negative influences at the flange connection in that solid components are employed and the distance between the measuring probe and the electronic system is kept as short as possible;

thermal stability is improved by the use of a specially tempered, double-walled housing, with the chemical refinement of the surface of the external housing (low emissivity coefficient) minimizing energy consumption as well as environmental influences;

the shield of the electronic is reinforced by structural measures against the escape of its own HF-fields as well as negative influences due to external HF-fields;

the seperate measuring probe is connected to an optimum sensitivity capacitive bridge which simultaneously also represents part of the output resonant circuit of the HF-power-amplifier;

temperature compensated components are employed, (temperature coefficient=0);

the HF-amplitude for feeding the bridge is stabilized (AGC) over the full operating range of the measuring probe with the said of the other bridge half and with inclusion of equivalent demodulator components (rectifier diodes and Darlington transistors); and the output signals are processed as it is customary in the industry in the form of load independent currents for remote evaluation with unreduced accuracy.

If the distance measuring system according to the invention is used in large numbers at the final inspection of centrifuge rotors which, due to the large amount, the following advantages could be realized:

system specific exclusion of almost all possible errors in the distance measurement at centrifuge rotors;

increased measuring accuracy;

enormous savings in time due to minimum calibration requirements in situ;

reproducible results over long periods of time without recalibration;

reduction of the amount of apparatus involved;

reduction of costs for acquisition as well as continued operation of the systems (no costly calibration mechanisms required).

The invention will be described in greater detail below with reference to an embodiment which is illustrated in FIGS. 1 to 4.

DESCRIPTION OF THE PREFERED EMBODIMENTS

Figure 1:
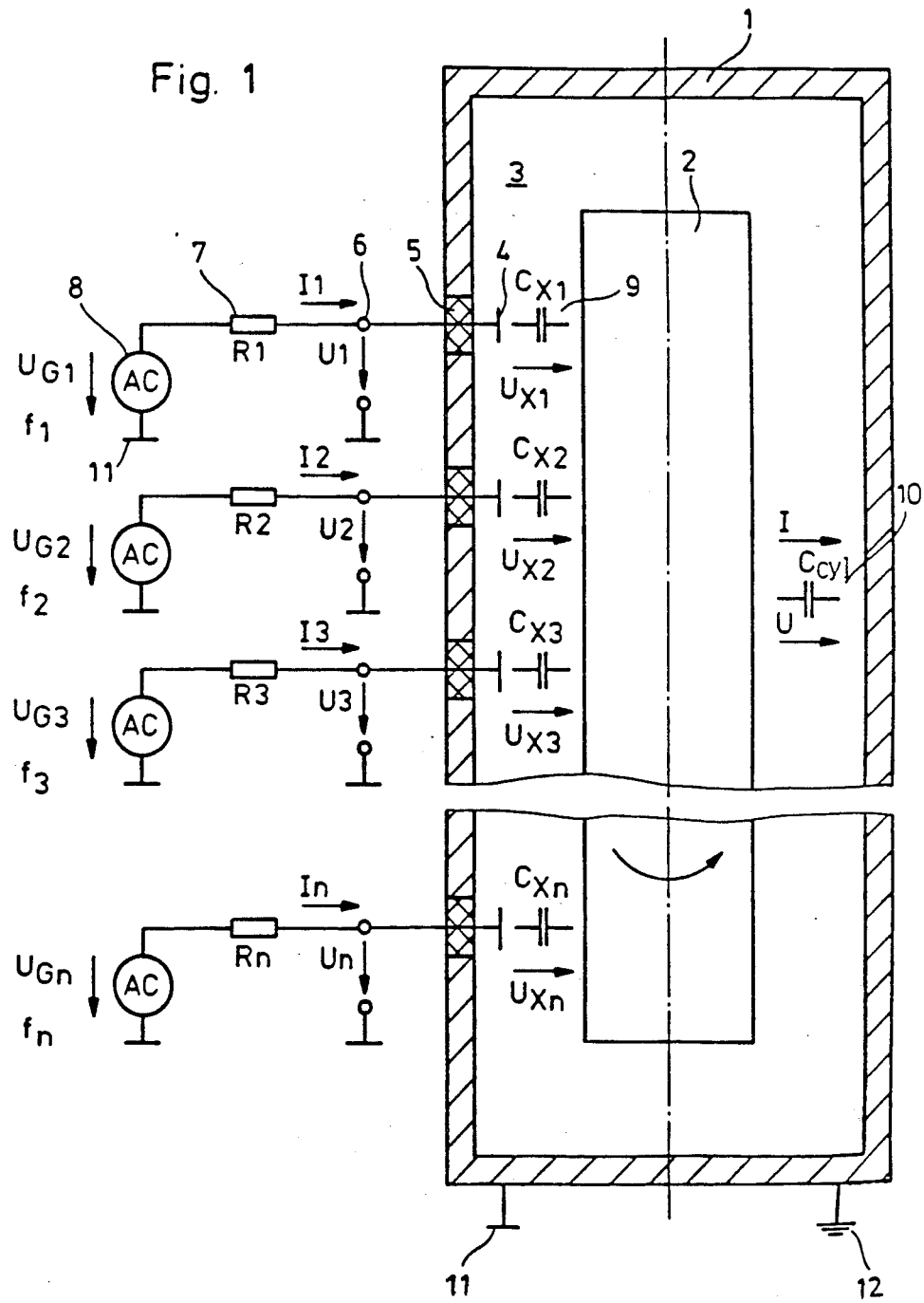
FIG. 1 is a partly schematic, partly pictorial view of a rotating system and measuring arrangement according to the invention.

FIG. 1 shows, schematically, a vacuum vessel 1 made of a material having good conductivity characteristics, such as, for example, aluminium, and grounded at 12. Vessel 1 houses a rotor 2 which is mounted to rotate at high speed almost without friction and which is at a floating electrical potential. Vacuum conditions exist within the interior 3 of the vessel 1. On the basis of the given geometric conditions, rotor 2 and vessel 1 form a cylindrical capacitor 10 having a capacitance $C_{cyl}$.

If, in order to detect the movement of rotor 2, capacitive measuring electrodes 4 are arranged, via insulated, vacuum-tight passages 5, at a defined distance from rotor 2, these electrodes form capacitors 9 having capacitances $C_{x1}$ to $C_{xn}$ with respect to rotor 2, with each capacitance value constituting a measure of the individual distance of a respective electrode 4 from object 2 being measured. Each electrode 4 is connected to a respective terminal 6 and each electrode 4 forms, with its associated passage 5, a capacitive measuring probe.

If now a plurality of alternating voltage generators 8 having a common ground potential 11 each feed a respective probe 4, 5, via the generator internal resistor 7, having a value $R_1$ to $R_n$, currents $I_1$ to $I_n$ flow through capacitors 9 to rotor 2 and from there via the common cylinder capacitor 10 to vessel 1 which is also connected with the common ground potential 11 of alternating voltage generators 8. The current I through this capacitor 10 is thus the sum of all individual probe currents $I_{x1}$ to $I_{xn}$ and thus is the cause of a voltage drop U across capacitor $C_{cyl}$. Each capacitor 9 has a voltage drop $U_x$.

If now, for example, only the signal paths of the first two alternating voltage generators 8 are considered, the following mesh-equations can be set up:

$$U_{G1} = I_1 * R_1 + U_1 = I_1 * R_1 + U_{x1} + U$$

$$U_{G2} = I_2 * R_2 + U_2 = I_2 * R_2 + U_{x2} + U$$

The only measuring signals available for evaluation are the voltages $U_1$ and $U_2$ which are composed of the actual measured values $U_{x1}$ and $U_{x2}$, respectively, of interest and the voltage U, common to both voltages $U_1$ and $U_2$, across cylinder capacitor 10. Due to the addition of the two alternating currents in this common coupling capacitor 10, the signals $U_1$ and $U_2$ influence one another.

If the carrier frequencies ($f_1$ and $f_2$) are close to one another, a beat develops when the alternating values are superposed. The influence on the original measuring signals is greatly dependent on the carrier frequency ratio and the generator voltage amplitude ratio, i.e. $f_1/f_2$ and $U_{G1}/U_{G2}$. Both amplitude and frequency of the measuring signals are influenced. Usually, the resulting oscillation is no longer a periodic function although it is composed of periodic, sinusoidal components. Depending on the differences between the carrier frequencies $f_n$ of the capacitive measuring systems, signals are thus generated which do not originate from the object 2 being measured. They cannot be distinguished from the useful signals.

Figure 2:
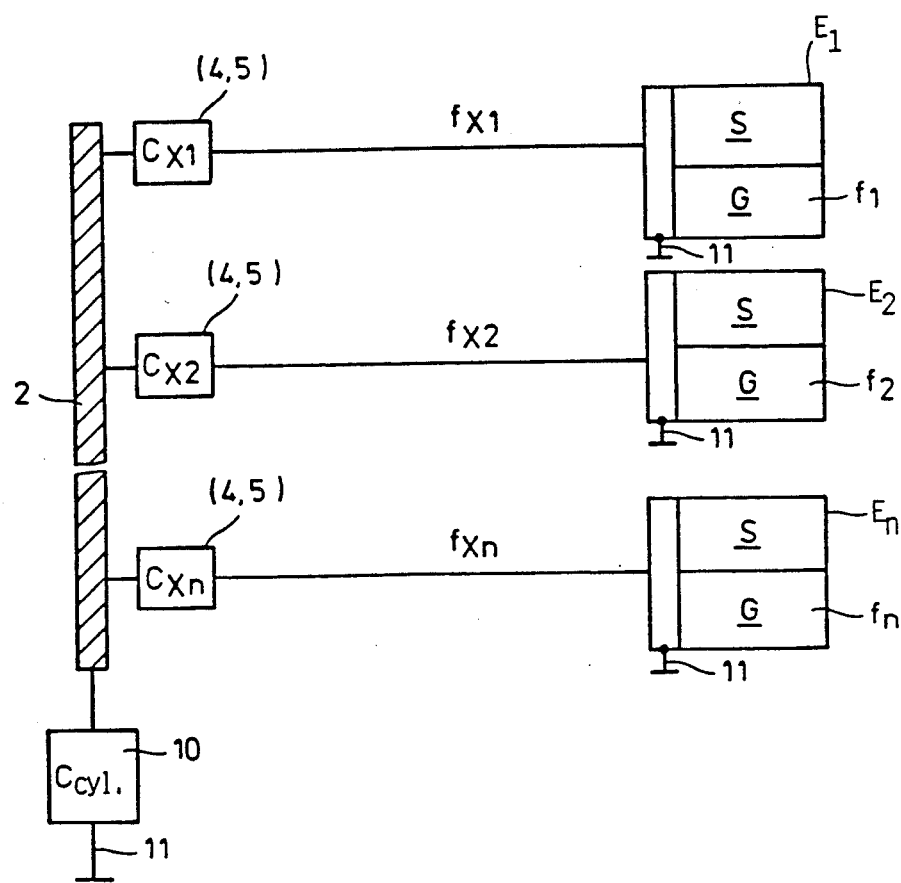
FIG. 2 is an equivalent circuit diagram of the basic components of the arrangement of FIG. 1.

FIG. 2 is an equivalent circuit diagram illustrating the manner in which correct measuring results can be obtained according to the invention. The capacitive measuring probes (4,5), each have an associated electronic unit $E_i$, where $i=1,2 \ldots n$, are connected to a common ground potential 11. Each electronic unit includes a generator $G_i$ and a signal processing chain $S_i$.

The influence of capacitor $C_{cyl}$ on the measuring result is eliminated in that, on the one hand, measuring probes 4, 5 have different associated carrier frequencies $f_1, f_2 \ldots f_n$ having a mutual frequency spacing $\Delta f_n$, and on the other hand, the signal processing chains $S_1, S_2, \ldots S_n$ have lowpass characteristics with a limit frequency $f_g$, such that the mutual spacing $\Delta f_n$ between the carrier frequencies $f_1, f_2, \ldots f_n$ is significantly greater than the limit frequency $f_g$.

The limit frequency $f_g$ depends only on the frequency range of the useful signals from probes 4, 5 to be evaluated.

The signals coming from measuring probes 4, 5 also contain parasitic beat frequencies $f_{x1}, f_{x2}, \ldots f_{xn}$ which, however, all lie above the limit frequency $f_g$ of the signal processing chain S and thus are not considered in the evaluation.

Figure 3:
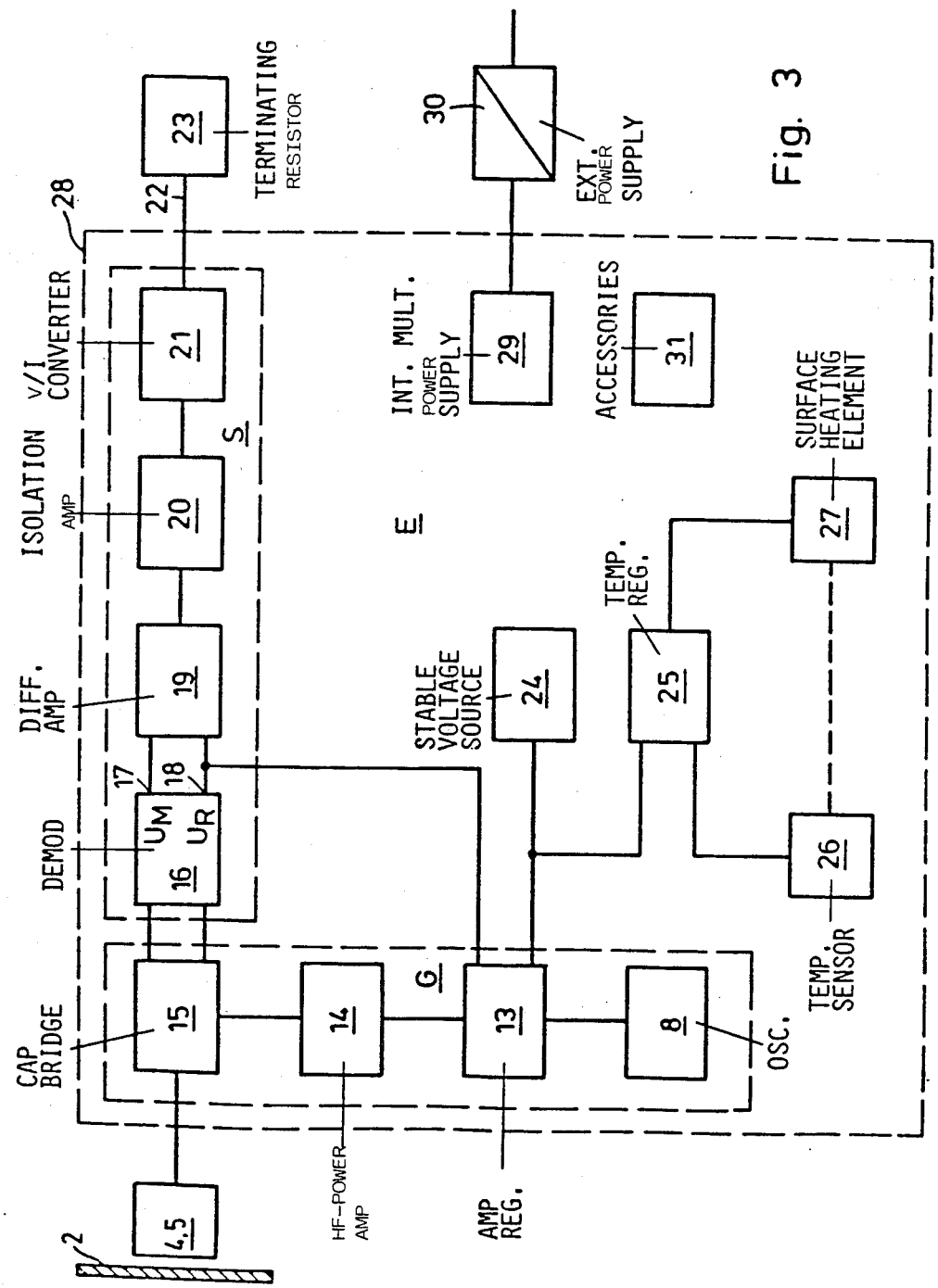
FIG. 3 is a block circuit diagram of an arrangement according to the invention.

FIG. 3 is a block circuit diagram of an arrangement of such an electronic unit E, which includes the generator G as well as the signal processing chain S. In generator G, a quartz stable HF-oscillator 8 feeds, via an amplitude regulator 13, an HF-power-amplifier 14 which is connected to a capacitive bridge 15. Measuring probe 4, 5 forms one of the four capacitors of bridge 15.

The demodulator 16, in chain S, is a simple AM-demodulator based on a so called "Villard"-cascade * which eliminates the high frequeny carrier from the output signals of the bridge.

* Published in "Halbleiter-Schaltungstechnik", U. Tietze, Ch. Schenk, Springer-Verlag Berlin, Heidelberg, New York, 1971, 2. Auflage The output signals $U_M$ at terminal 17 and $U_R$ at terminal 18 origine from each bridge half, i.e. from the fixed branch as well as from the branch which is variable because it contains probe 4, 5. The fixed bridge branch voltage $U_R$ serves, on the one hand, to stabilize the HF-amplitude via regulator 13, which additionally receives a highly stable reference voltage from a source 24. On the other hand, together with voltage $U_M$ which is influenced by the change in capacitance of measuring probe 4, 5, as a result of changes in distance from the object 2 being measured, voltage $U_R$ forms, via differential amplifier 19, the actual useful signal. In order to avoid ground loops, the useful signal is fed, via an isolation amplifier 20 to a V/I- converter 21 which then makes available a load independent current at its output. By means of a suitable external terminating resistor 23, the current signal, after having been transmitted in a manner secure against interference, will be converted back to a voltage, even if conductor 22 extends over a long distance, which voltage is then available for further evaluation.

To avoid temperature influences on the generation and processing of signals, housing 28 is composed of an outer housing shell enclosing an inner housing shell. The interior of the inner housing shell is kept at a constant value by a temperature regulator 25. For this purpose, this regulator detects the actual temperature of the housing interior by way of a sensor 26 and compares it with the highly stable reference voltage from source 24. The output of regulator 25 then feeds a surface heating element 27 on the inner housing shell.

For test and calibration purposes, the user has available necessary accessories 31 which permit him to perform these operations when the system is in the operating state.

The entire electronic unit E is fed by an external power supply 30. Since the location of use of the unit may be varied, and thus the length of the connecting cable to the power supply 30 may vary greatly, an internal multiple power supply 29 is provided which regulates the losses in the input lines and also makes available floating supply voltages for the isolation amplifier 20.

Figure 4:
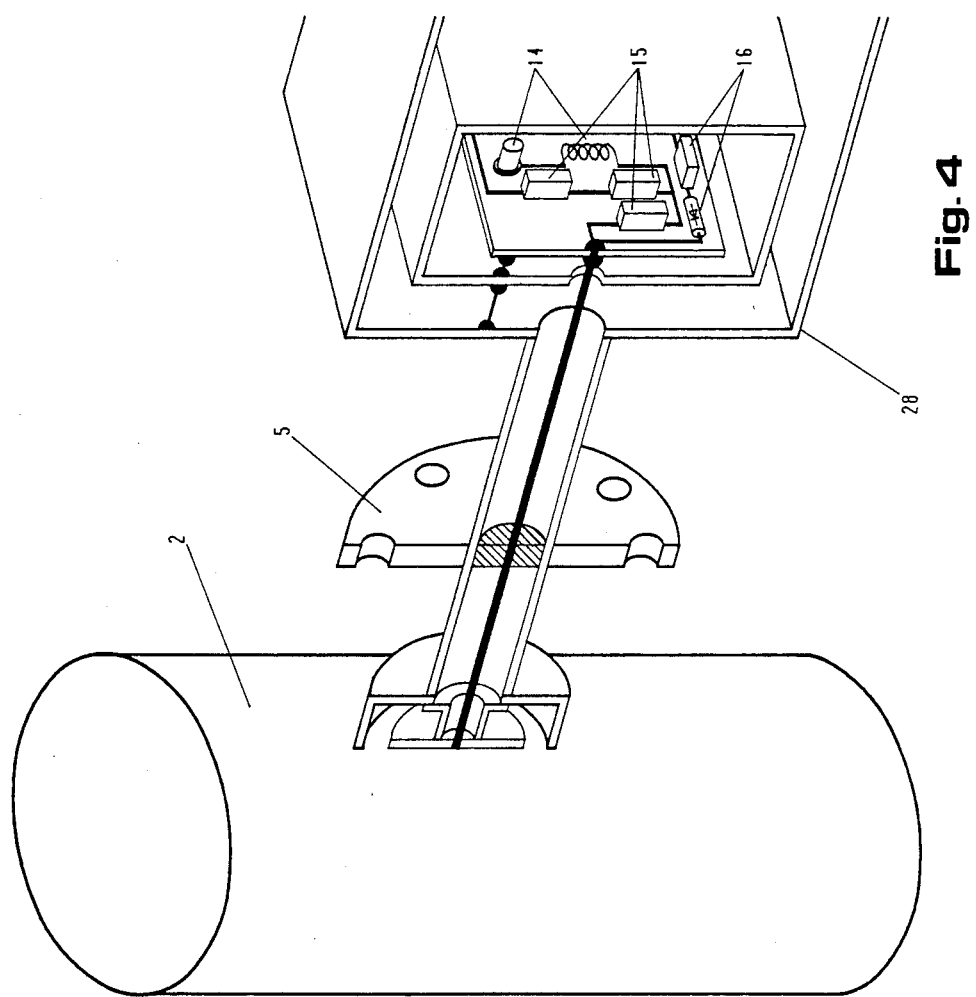
FIG. 4 is a sectional view of a suitable embodiment for the capacitive measuring system.

FIG. 4 is a sectional view of a suitable embodiment for the capacitive measuring system showing also the manner in which a probe can be connected to an electronic unit according to the invention.

The invention now being fully described, it will be apparent to one of ordinary skill in the art that many changes and modifications can be made thereto without departing from the spirit or scope of the invention as set forth herein.

The present disclosure relates to the subject matter disclosed in German Application No. P 36 16 390.2 of May 15, 1986, the entire specification of which is incorporated herein by reference.

What is claimed is:

1. In a method for measuring the dynamical behavior of an elongate body which forms a total capacitance with its environment and which has a longitudinal axis about which the body rotates, which method includes a contact-free capacitive measurement of changes in the position of the body transverse to the longitudinal axis by means of at least two measuring probes each disposed to form with the body a respective capacitor having a capacitance value corresponding to the distance between the probe and the body, the improvement comprising:

applying to each measuring probe a respective alternating current signal having a frequency selected such that the frequency of the signal applied to each probe differs from that applied to each other probe by at least a selected frequency difference value;

deriving from each probe an output signal having an amplitude representative of the capacitance value of the capacitor formed by that probe with the body; and passing the output signal from each probe through a respective signal processing circuit having a lowpass characteristic with an upper limit frequency value which is less than the selected frequency difference value, with the signal processing circuits associated with all of the probes having the same upper limit frequency value.

2. A system for measuring the dynamical behavior of an elongate body which is enclosed by a vacuum vessel so that the body is electrically insulated from, and forms a capacitance with, the vessel, the elongate body having a longitudinal axis about which the body rotates, said system comprising:

at least two measuring electrodes extending through, and electrically insulated from, the vessel and each located at a selected distance from the body to form with the body a respective capacitor having a capacitance value corresponding to the distance between said probe and the body;

a plurality of signal generator means each connected between a respective probe and said vessel which represents the common ground potential of all units for applying to the respective probe an alternating current signal having a respective frequency which differs from that of the signal applied to each other probe by at least a selected frequency difference value; and a plurality of signal processing means each connected to a respective probe for deriving from the respective probe an output signal having an amplitude representative of the capacitance value of the capacitor formed by the respective probe with the body, each signal processing means including a signal processing circuit connected to receive and process the associated derived signal and having a lowpass characteristic with an upper limit frequency value which is less than the selected difference frequency value.

3. A system as defined in claim 2 wherein all of said signal processing means have identical signal processing circuits with the same upper limit frequency value.

4. A system as defined in claim 3 further comprising a housing enclosing each said signal generator means and signal processing means which also represents the common ground potential for the electronic units.

5. A system as defined in claim 2 wherein each signal generator means comprises: a high frequency oscillator producing an output signal at the respective frequency; an amplitude regulator connected to said oscillator for producing a regulated output signal based on the signal of said oscillator; a high frequency power amplifier connected to said regulator for conducting this signal; and a capacitive bridge including the capacitor formed by the respective probe with the body, said bridge being connected to receive the signal conducted by said power- amplifier, and said signal processing circuit comprises a demodulator connected to said bridge for deriving a demodulated signal representative of the capacitance value of the capacitor formed by the respective probe with the body.

6. A system as defined in claim 5 wherein said capacitive bridge includes a branch containing capacitors with a fixed capacitance, which branch produces an output signal proportional to the HF- signal supplied to said bridge by said power amplifier, and further comprising means connected for supplying the output signal produced by said branch to said amplitude regulator for stabilizing the HF- signal produced by said oscillator.

7. A system as defined in claim 6 further comprising a source of a highly stabilized voltage which is used as reference for said amplitude regulator.

8. A system as defined in claim 2 wherein said signal processing circuit of each said signal processing means comprises: a demodulator connected to the respective probe for deriving a demodulated signal representative of the distance between the respective probe and the body; a differential amplifier connected to receive the demodulated signal and a reference signal; an isolation amplifier connected to receive the output signal from said differential amplifier; and a voltage/current-converter (V/I-converter) connected for producing a load independent output current proportional to the output voltage from said isolation amplifier.

9. A system as defined in claim 2 further comprising temperature stabilizing means arranged for maintaining said signal generator means and said signal processing means associated with each probe at a constant temperature.

* * * * *